United States Patent
Studer et al.

(10) Patent No.: US 10,661,577 B2
(45) Date of Patent: May 26, 2020

(54) FROTH COALESCING

(71) Applicant: Hewlett-Packard Development Company, L.P., Houston, TX (US)

(72) Inventors: Anthony Studer, Corvallis, OR (US); Robert Wickwire, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/093,452

(22) PCT Filed: Jul. 11, 2016

(86) PCT No.: PCT/US2016/041712
§ 371 (c)(1),
(2) Date: Oct. 12, 2018

(87) PCT Pub. No.: WO2018/013071
PCT Pub. Date: Jan. 18, 2018

(65) Prior Publication Data
US 2019/0134988 A1    May 9, 2019

(51) Int. Cl.
| | |
|---|---|
| *B41J 2/19* | (2006.01) |
| *B01D 36/00* | (2006.01) |
| *B01D 19/00* | (2006.01) |
| *B01D 19/02* | (2006.01) |
| *B01D 29/05* | (2006.01) |
| *B41J 2/175* | (2006.01) |

(52) U.S. Cl.
CPC ............ *B41J 2/19* (2013.01); *B01D 19/0042* (2013.01); *B01D 19/02* (2013.01); *B01D 29/05* (2013.01); *B01D 36/001* (2013.01); *B01D 36/003* (2013.01); *B41J 2/175* (2013.01); *B41J 2/17513* (2013.01); *B41J 2/17523* (2013.01); *B41J 2/17553* (2013.01); *B41J 2/17563* (2013.01)

(58) Field of Classification Search
None
See application file for complete search history.

(56) References Cited

U.S. PATENT DOCUMENTS

| | | |
|---|---|---|
| 5,252,229 A | 10/1993 | Rojey et al. |
| 6,234,621 B1 | 5/2001 | Musser et al. |
| 6,454,835 B1 | 9/2002 | Baumer |
| 7,726,786 B2 | 6/2010 | Therien et al. |
| 8,439,489 B2 | 5/2013 | Tomlin et al. |

(Continued)

FOREIGN PATENT DOCUMENTS

| | | |
|---|---|---|
| EP | 1322395 | 7/2003 |
| JP | 05277304 | 10/1993 |

(Continued)

*Primary Examiner* — Erica S Lin
(74) *Attorney, Agent, or Firm* — HP Inc. Patent Department

(57) ABSTRACT

An example device includes a frame having at least one outer opening and at least one inner opening recessed from the outer opening, at least one filter screen mounted on a perimeter of the at least one inner opening to form an inner chamber, and at least one cover layer mounted on a perimeter of the at least one outer chamber to form an outer chamber. The filter screen separates the inner chamber from the outer chamber, and the filter screen prevents froth from crossing and allows coalesced fluid to cross into the outer chamber.

15 Claims, 4 Drawing Sheets

(56) References Cited

U.S. PATENT DOCUMENTS

| | | | |
|---|---|---|---|
| 2004/0066434 A1* | 4/2004 | Roof | B41J 2/17513 347/86 |
| 2006/0061637 A1* | 3/2006 | Therien | B41J 2/175 347/84 |
| 2006/0090645 A1* | 5/2006 | Kent | A61M 1/1658 95/46 |
| 2007/0006735 A1* | 1/2007 | Olsen | B01D 19/0031 96/188 |
| 2009/0251507 A1 | 10/2009 | Lai et al. | |
| 2010/0079559 A1 | 4/2010 | Justice et al. | |
| 2012/0007916 A1 | 1/2012 | Kumagai | |
| 2015/0266305 A1 | 9/2015 | Gasso Puchal et al. | |

FOREIGN PATENT DOCUMENTS

| | | |
|---|---|---|
| JP | 2013158962 | 8/2013 |
| SU | 524557 A1 | 11/1976 |

\* cited by examiner

FROTH COALESCING

BACKGROUND

Froth is a common occurrence in many fluids. Froth is a mass of bubbles in a fluid, or on the surface of the fluid. Froth can form as air is incorporated into the fluid. For example, in ink printing systems, as air is introduced into an ink reservoir to maintain pressure, froth may form in the corpus of the ink or on a surface of the ink. Froth is also found in other fluids, for example detergents or liquid soaps. Such froth may inhibit the operations of a system that processes fluids that are susceptible to froth formation

BRIEF DESCRIPTION OF THE DRAWINGS

For a more complete understanding of various examples, reference is now made to the following description taken in connection with the accompanying drawings in which.

DETAILED DESCRIPTION

Figure 1:
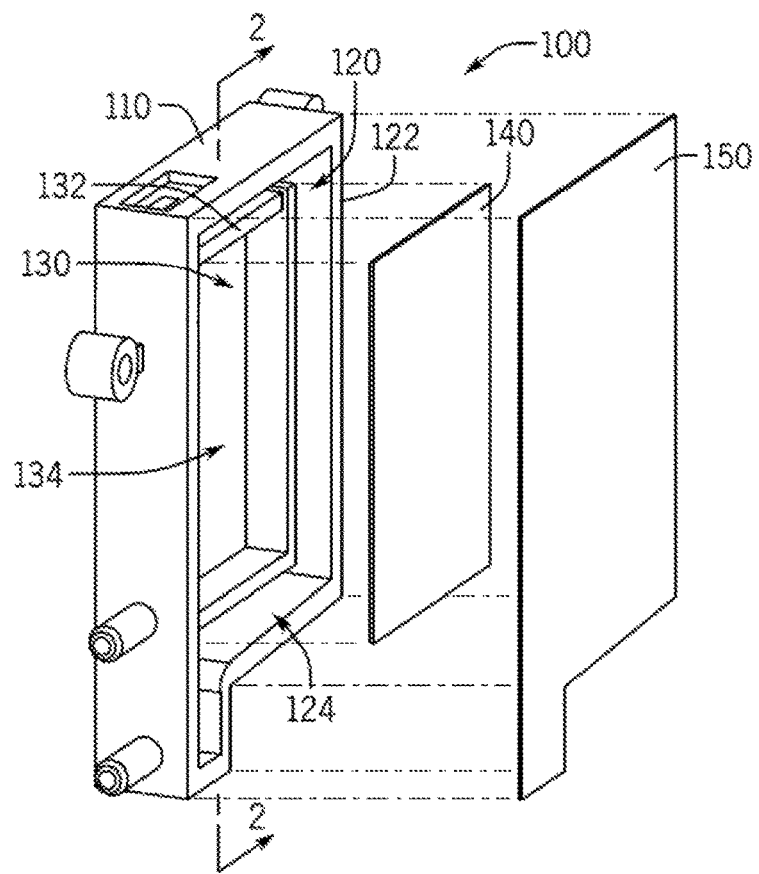
FIG. 1 is an exploded, perspective view of an example defrothing device.

Various examples described herein provide for coalescing of fluid in a froth. In one example, a device receives a froth, as may be formed in a fluid such as ink, and separates the froth into a coalesced fluid and air. The coalesced fluid may be collected and re-circulated to a fluid reservoir, such as an ink supply, and the air may be vented to the atmosphere. In one example, an example device is formed of a frame having an inner chamber into which froth may be directed and an outer chamber for receiving the coalesced fluid. The inner chamber is defined at least in part by a filter screen mounted on a recessed rim within the frame, and the outer chamber is defined at least in part by the filter screen and an outer cover layer mounted on an outer rim of the frame. The inner chamber is sized to facilitate breaking of the bubbles in the froth. In this regard, the inner chamber has a width sized to accommodate bubbles in the froth such that the bubbles are substantially in a single-wide formation. As froth is directed into the inner chamber, the bubbles are forced to travel through the inner chamber. As the bubbles are broken, the coalesced fluid passes through the filter screen and into the outer chamber, while air is vented from the inner chamber to, for example, the atmosphere.

As described above, froth may be found in many fluids. For example, in printing systems, a backpressure may be desirable in an ink printhead. To maintain this pressure, air is introduced into the printhead. The mixture of the ink and air generates froth within the printhead. While specific reference is made to froth in an ink printhead, such froth can exist in any fluid processing system. For example, some devices such as industrial cleaning devices use liquid detergent to clean components of the system. These devices similarly contain a froth layer due to the incorporation of air, surfactants, or other components.

Such froth can impact the functionality of the system. For example, in an ink system, froth may reduce the accuracy of certain sensors such as an ink-level gauge or a sensor that indicates that the system is out of ink. The accuracy of these sensors and gauges impacts user satisfaction, system performance, and system reliability. More specifically, the froth present in an ink supply could prematurely trigger an out-of-ink sensor. Such a premature triggering of the sensor could lead to the replacement of an ink supply prior to its exhaustion, which is an inefficient use of ink and may create an impression on the customer that an ink supply drains sooner than it actually does. In some cases, premature triggering of an ink sensor could also lead to failure of the printing system.

Some systems have implemented a batch froth dissipation system wherein froth accumulates and dissipates over time and is gravity-fed back into the system. However, this system relies on time to dissipate the froth, and a lag is accordingly introduced between froth accumulation and coalescence. Such a lag, in addition to being inefficient, also leads to erroneous fluid level readings.

Accordingly, the present disclosure describes example devices and methods for coalescing a frothy fluid into coalesced fluid and air. Specifically, the present disclosure describes a system that continuously, and not in a batched or periodic fashion, coalesces a frothy fluid. In so doing, the function of the corresponding system in general is improved, specifically the accuracy of system sensors is improved, which leads to improved system performance, increased customer satisfaction, and improved fluid efficiency.

Figure 2:
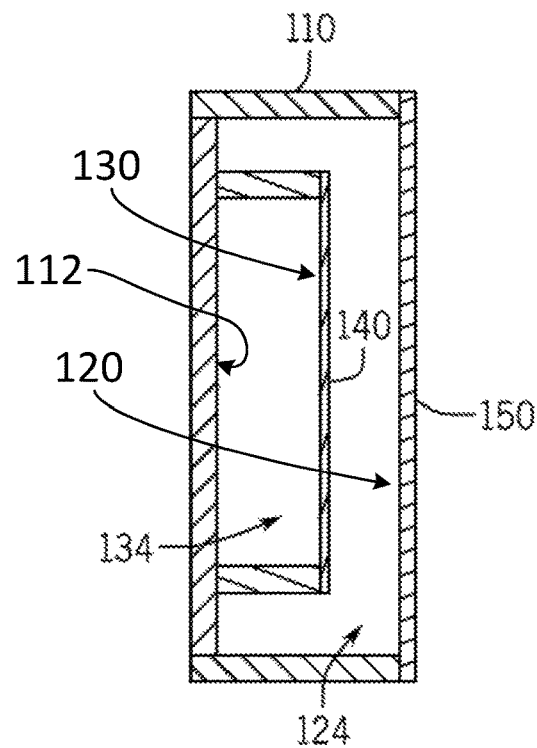
FIG. 2 is a cross-sectional view of the example defrothing device of FIG. 1 taken along 2-2.

Referring now to the figures, FIGS. 1 and 2 illustrate an example defrothing device 100. The example device 100 includes a frame 110 with various features formed therein. In the example illustrated in FIGS. 1 and 2, the frame 110 is generally in the shape of a rectangular box, but various other shapes are possible and are contemplated within the scope of the present disclosure. In various examples, the frame 110 may be formed of a molded plastic or various other materials. Various features of the frame are provided to facilitate coalescing of a froth directed into the frame 110.

In the example illustrated in FIGS. 1 and 2, the frame 110 is provided with a wall 112 on one side of the frame 110. The opposite side of the frame 110 is open and provided with an outer opening 120 defined by an outer rim 122 which substantially forms the perimeter of the outer opening 120. In the example of FIGS. 1 and 2, the outer rim 122 of the outer opening 120 is also the outer perimeter of the frame 110. In other examples, the outer rim 122 of the outer opening may be separate from the outer-most portion of the frame.

The example frame 110 of the example defrothing device 100 of FIGS. 1 and 2 further includes an inner opening 130 defined by an inner rim 132 which substantially forms the perimeter of the inner opening 130. The inner opening 130 of the example frame 110 is recessed from the outer opening 120, as most clearly illustrated in the cross-sectional view of FIG. 2. In this regard, the distance between the wall 112 of the frame 110 and the outer rim 122 is greater than the distance between the wall 112 and the inner rim 132.

As shown in the exploded view of FIG. 1 and the cross-sectional view of FIG. 2, a filter screen 140 is mounted on the perimeter of the inner opening 130 to form an inner chamber 134. In this regard, the filter screen 140 may be mounted to the inner rim 132 in any of a variety of manners. For example, the filter screen 140 may be attached by heat staking it the inner rim 132. Of course, other manners of attachment of the filter screen 140 are possible and are contemplated within the scope of the present disclosure.

The filter screen 140 may be formed of a variety of materials, including metal or plastic, for example. As described in greater detail below, the filter screen 140 may be used to dissipate bubbles in a froth that may be introduced into the inner chamber 134. In this regard, the filter screen 140 may include pores to allow coalesced fluid to pass therethrough but prevents froth (e.g., bubbles) from passing. The size, shape and distribution of the pores in the filter screen 140 may be selected based on a variety of factors such as the type of fluid and expected flow rate of the froth, for example. Similar factors may be used to select the size and shape of the inner chamber 134. For example, a larger and taller inner chamber 134 may be desirable for a higher flow rate of froth therethrough.

Referring again to FIGS. 1 and 2, the example defrothing device 100 is provided with a cover layer 150 mounted on the perimeter of the outer opening 120 to form an outer chamber 124. In this regard, the cover layer 150 may be mounted to the outer rim 122 in any of a variety of manners, such as by heat staking it the outer rim 122. Of course, other manners of attachment are possible and are contemplated within the scope of the present disclosure. The cover layer 150 may be formed of a variety of materials that prevent a fluid from passing therethrough. For example, the cover layer 150 may be a film formed of a metal or a plastic.

Thus, as most clearly illustrated in the cross-sectional view of FIG. 2, the inner chamber 134 is defined at least in part by the wall 112 of the frame 110 on a first side and the filter screen 140 on a second side, the second side being opposite the first side. Similarly, the outer chamber 124 is defined at least in part by the filter screen 140 on one side and the cover layer 150 on the opposite side. Thus, the filter screen 140 separates the inner chamber 134 and the outer chamber 124.

Figure 3:
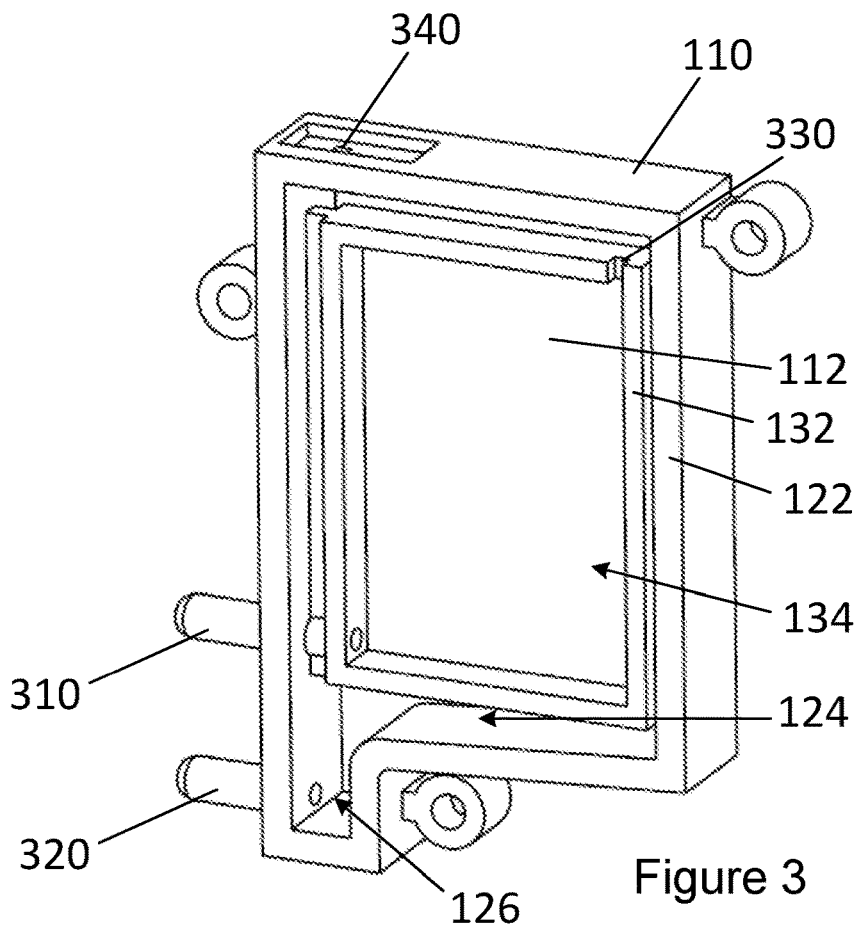
FIG. 3 is another perspective view of the example defrothing device of FIG. 1 with the filter screen and the cover layer removed.

Referring now to FIG. 3, a perspective view of the frame 110 of the defrothing device 100 of FIGS. 1 and 2 is illustrated from another perspective. In this regard, FIG. 3 provides a view of the frame 110 with the filter screen 140 and the cover layer 150 removed. As most clearly illustrated in FIG. 3, the frame 110 is provided with an inlet port 310 through which froth may be introduced into the defrothing device 100. In this regard, the inlet port 310 extends from the outside of the frame 110 and into the inner chamber 134 which is formed when the filter screen (not shown in FIG. 3) is mounted to the inner rim 132. As illustrated in the example of FIG. 3, the inlet port is positioned near the bottom portion of the inner chamber 134. Thus, once froth is introduced into the inner chamber 134, the froth is forced to travel upward in the inner chamber 134 toward the inner chamber air vent 330.

The frame 110 is further provided with an outlet port 320 through which coalesced fluid may be directed out of the defrothing device 100 to, for example, a reservoir for the fluid. In this regard, the outlet port 320 extends from the outer chamber 124 (which is formed when the filter screen and the outer layer are mounted) and through the frame 110 to outside the frame. As illustrated in the example of FIG. 3, the outlet port is positioned near the bottom portion of the outer chamber 124. In the example illustrated in FIG. 3, the frame 110 is formed to provide a sump portion 126 of the outer chamber 124. Thus, as the coalesced fluid crosses the filter screen into the outer chamber, gravity causes the fluid to travel downward and into the sump portion 126. Accordingly, the outlet port 320 is located at the sump portion 126 of the outer chamber 124.

Referring again to FIG. 3, the frame 110 is provided with vents 330, 340 to allow air to escape from the defrothing device 100. Thus, as the froth is separated in the inner chamber 134 and the coalesced fluid passes through the filter screen 140 into the outer chamber 124, the remaining air may be vented from the inner chamber 134 through the vent 330 and to the atmosphere through the vent 340.

Figure 4:
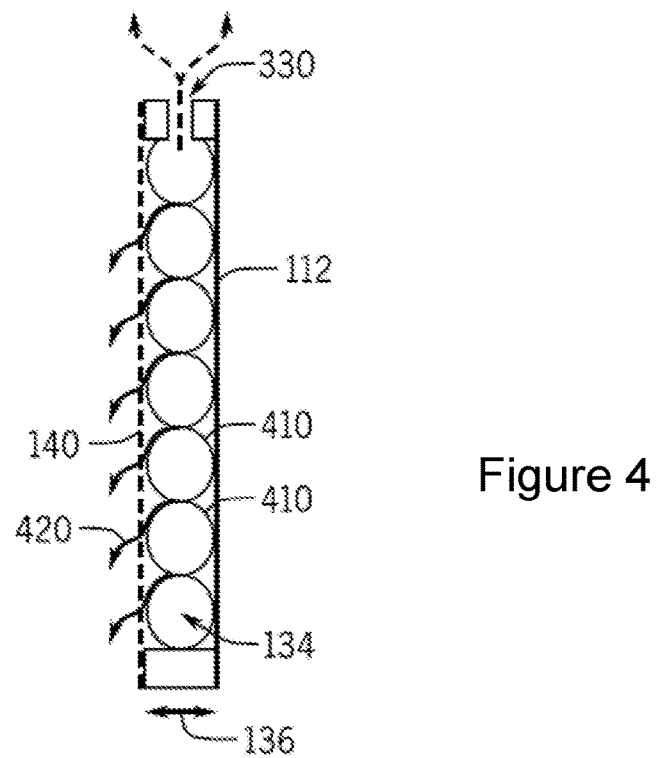
FIG. 4 is a schematic illustration of the example defrothing device of FIG. 1 illustrating various principles described herein.

Referring now to FIG. 4, a schematic illustration of the example defrothing device of FIGS. 1-3 illustrates principles of defrothing. For purposes of simplicity, FIG. 4 illustrates only a portion of the defrothing device, including the wall 112, the filter screen 140, the inner chamber 134, and the vent 330. Froth is illustrated in the inner chamber 134 in the form of bubbles 410.

As illustrated in FIG. 4, the width of the inner chamber 134 between the wall 112 of the frame 110 and the filter screen 140 is sized to facilitate coalescing of the fluid in the froth. In the example of FIG. 4, froth enters at a low point of the inner chamber 134 (e.g., through the inlet port 310 shown in FIG. 3) and is driven up the inner chamber. In the example of FIG. 4, the width 136 of the inner chamber 134 is sized to accommodate bubbles in the froth such that the bubbles are substantially in a single-wide formation. This arrangement speeds the bubbles through the inner chamber and facilitates thinning of the bubbles 410. The width 136 of the inner chamber 134 may also cause exertion of pressure on the walls of the bubbles 410, thus abrading the bubbles 410 against the rough porous surface of the filter screen 140, causing rupture of the surface of the bubbles 410. Once the bubbles are broken, the coalesced fluid 420 is passed through to the filter screen, as indicated by the arrows, and the resultant air is passed upward through the vent 330.

Figure 5:
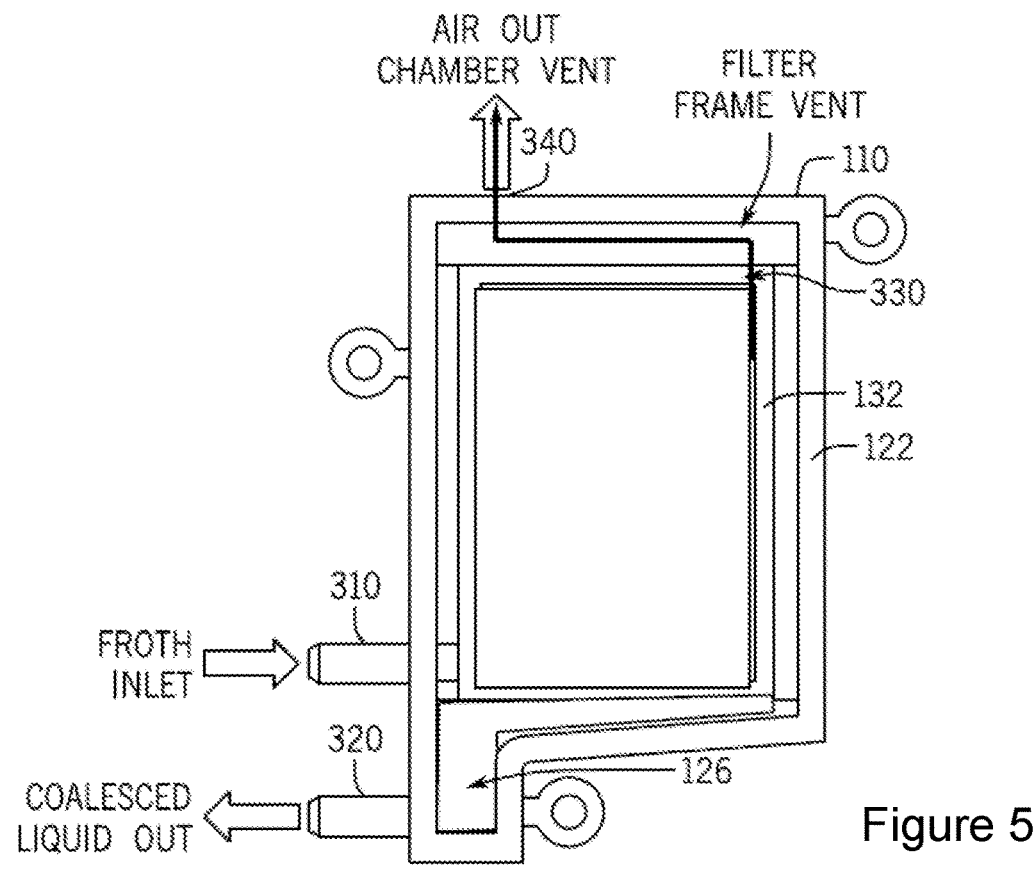
FIG. 5 is a plan view illustrating operation of the example defrothing device of Figure.

Referring now to FIG. 5, a plan view of the example defrothing device 100 illustrates operation of the defrothing device 100. As described above, froth is introduced into the example defrothing device 100 through the inlet port 310 into the bottom portion of the inner chamber 134. As the froth travels upward within the inner chamber 134, the bubbles of the froth are broken, and the coalesced fluid passes through the filter screen (not shown in FIG. 5) and into the outer chamber. The coalesced fluid is collected in the sump portion 126 of the outer chamber and may be directed out of the defrothing device 100 through the outlet port 320. The air resulting from the breaking of the bubbles in the froth is vented through the vents 330 and 340 to the atmosphere.

Figure 6:
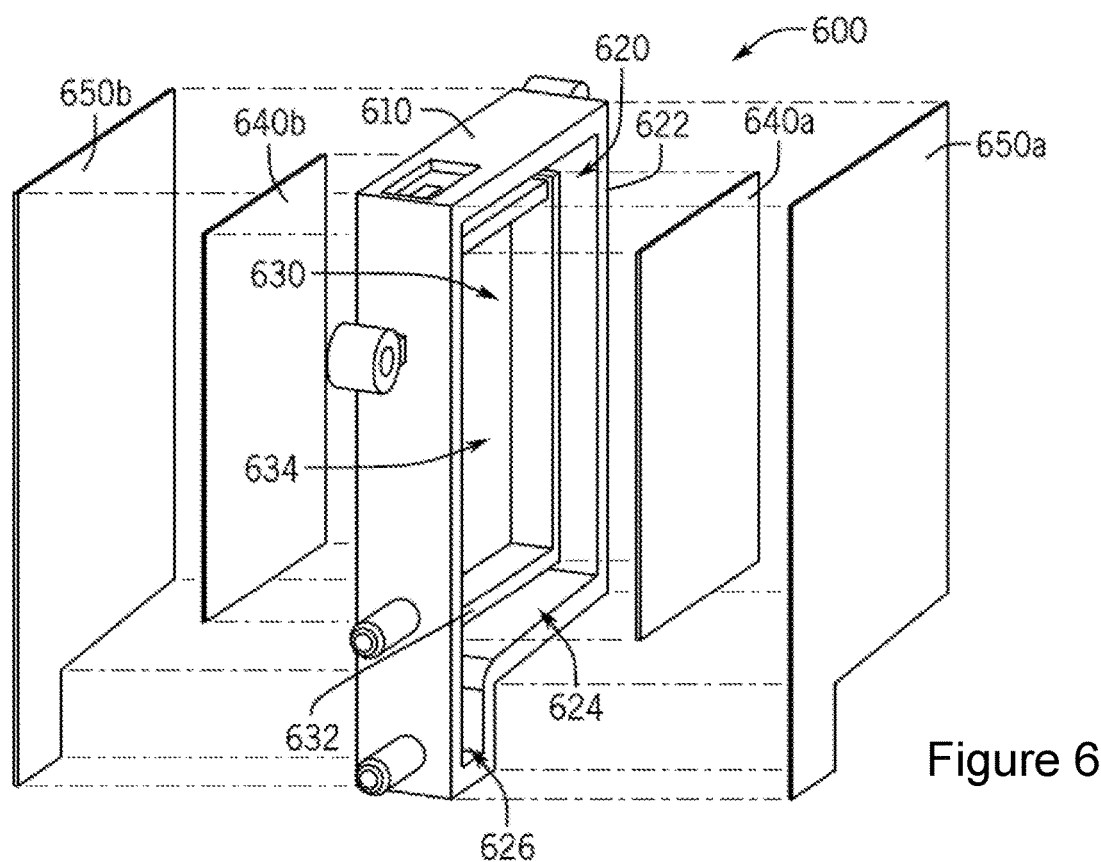
FIG. 6 is an exploded, perspective view of another example defrothing device.

Referring now to FIG. 6, another example defrothing device is illustrated in an exploded, perspective view. The example defrothing device 600 of FIG. 6 is similar to the defrothing device 100 described above with reference to FIGS. 1-5, but provided a two-sided filtration of the coalesced fluid. Accordingly, the example defrothing device 600 of FIG. 6 includes a frame 610 which is open on both sides. In this regard, the frame 610 is provided with an outer opening 620 defined by an outer rim 622 which substantially forms the perimeter of the outer opening 620. While the perspective view shown in FIG. 6 only shows the outer opening 620 on one side, a similar outer opening with an outer rim is provided on the opposite side.

The example frame 610 of the example defrothing device 600 of FIG. 6 further includes an inner opening 630 defined by an inner rim 632 which substantially forms the perimeter of the inner opening 630. The inner opening 630 of the example frame 610 is recessed from the outer opening 620. Again, the perspective view of FIG. 6 only shows the inner opening 630 on one side. A similar inner opening with an inner rim is provided on the opposite side and is recessed from the outer opening on the opposite side.

Filter screens 640a, 640b are mounted on the perimeter of inner openings 630 on each side to form an inner chamber 634. Further, the example defrothing device 600 is provided with cover layers 650a, 650b mounted on the perimeter of outer openings 620 on each side to form an outer chamber 624 on each side. The outer chambers 624 on each side may merge with a single sump portion 626 provided near the bottom portion of the frame 610. Thus, the inner chamber 634 is defined at least in part by the one filter screen 640a on a first side and another filter screen 640b on a second side, the second side being opposite the first side. Further, each outer chamber 624 is defined at least in part by one filter screen 640a, 640b on one side and one cover layer 650a, 650b on the opposite side. Thus, a filter screen 640 separates the inner chamber 634 and each outer chamber 624.

Figure 7:
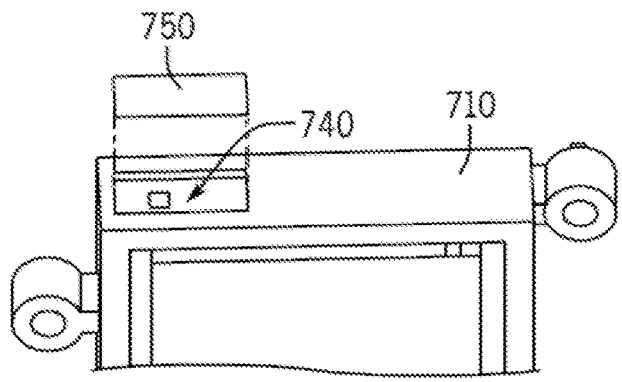
FIG. 7 illustrates an example vent structure of an example defrothing device.

Referring now to FIG. 7, an example vent structure of an example defrothing device is illustrated. As illustrated in FIG. 7, a frame 710 of an example defrothing device may be provided with a vent 740 which allows air from the defrothing device to vent to the atmosphere. In the example illustrated in FIG. 7, the vent 740 may be circular is shape and have a diameter of between about 1 mm and about 3 mm or, or more preferably, between about 1.5 mm and about 2 mm.

The vent 740 of the frame 710 of FIG. 7 is covered with a membrane 750 provided on the outer surface of the frame 710. In various examples, the membrane 750 is formed of a material which allows air (or gas) to pass therethrough but prevents passage of a fluid. In one example, the membrane is formed of an oleophobic material and, therefore, prevents water, oil or other fluids from passing therethrough.

Figure 8:
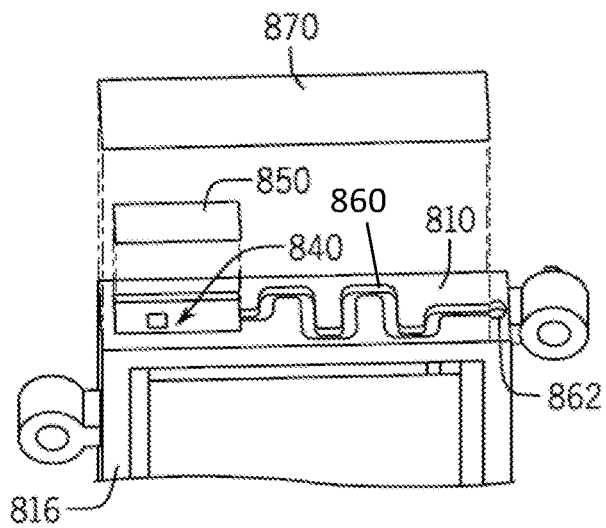
FIG. 8 illustrates another example vent structure of an example defrothing device.

Referring now to FIG. 8, another example vent structure of an example defrothing device is illustrated. As illustrated in FIG. 8, a frame 810 of an example defrothing device may be provided with a vent 840 which allows air from the defrothing device to vent to the atmosphere. The vent 840 is covered with a membrane 850 provided on the outer surface of the frame 810. In various examples, the membrane 850 is formed of a material which allows air (or gas) to pass therethrough but prevents passage of a fluid, such as an oleophobic material.

In the example of FIG. 8, a labyrinth 860 is formed on the outer surface of the frame 810. The labyrinth 860 extends from the vent 840 to a termination vent 862. A cover 870 is mounted on the outer surface of the frame 810 and covers at least the labyrinth but allows the termination vent to be exposed to the atmosphere. In various examples, the cover 870 is formed of a material with air-barrier properties. In this regard, the cover 870 reduces the water vapor transmission rate (WVTR) from the defrothing device. Further, the labyrinth 860 forms a long path with a small cross-sectional area to slow down the evaporation rate of any fluid in the chamber or system. The labyrinth 860, reduces the evaporation rate by creating a gradient between a fully humidified region at the beginning of the labyrinth 860 near the vent 840 and atmospheric air at the termination vent 862 at the end of the labyrinth 860.

Figure 9:
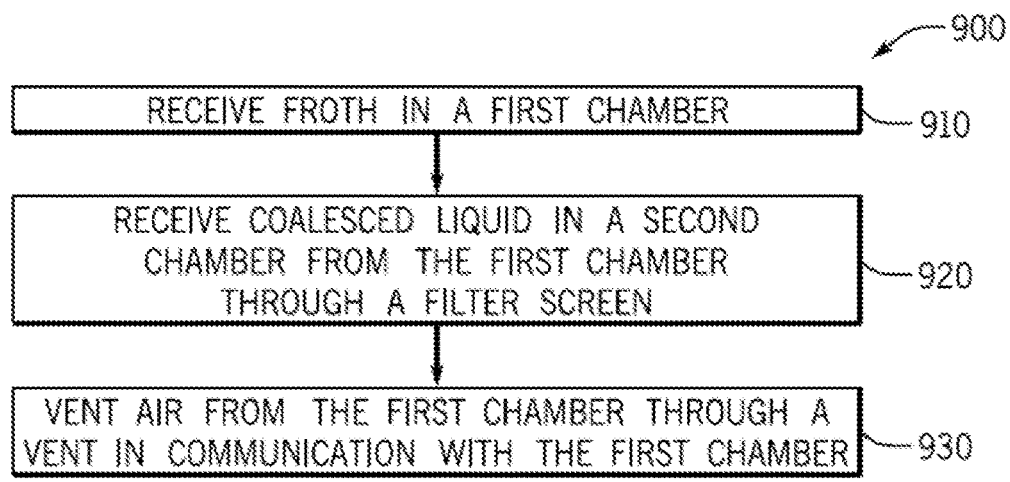
FIG. 9 is a flow chart illustrating an example process for processing of coalescing froth.

Referring now to FIG. 9, a flow chart illustrates an example method for froth coalescing. The example method 900 may be implemented in various devices, including the example devices described above with reference to FIGS. 1-8. In accordance with the example method 900, froth is received in a first chamber (block 910). For example, with reference to the example defrothing device 100 of FIGS. 1-5, froth may be received in the inner chamber 134 through the inlet port 310.

In the example method 900, coalesced fluid from the froth is received in a second chamber from the first chamber through a filter screen (block 920). For example, as described above, the froth is separated into fluid and air by breaking of the bubbles. In the example defrothing device 100 of FIGS. 1-5, the coalesced fluid passes through the filter screen 140 into the outer chamber 124.

In the example method 900, air is vented from the first chamber through a vent that is in communication with the first chamber (block 930). For example, with reference to the example defrothing device 100 of FIGS. 1-5, breaking of bubbles in the inner chamber results in the separation of coalesced fluid and air. As noted above, the coalesced fluid is passed through the filter screen 140 into the outer chamber 124. The air is vented from the inner chamber 134 through the vents 330, 340 to the atmosphere.

Thus, in accordance with various examples described herein, defrothing devices can continuously process froth. The froth can be efficiently separated into coalesced fluid and air. The coalesced fluid can be directed to a reservoir for use, and the air can be vented to the atmosphere, for example.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A device, comprising:
    a frame having an outer opening and an inner opening recessed within the outer opening;
    a filter screen mounted on a perimeter of the inner opening to form an inner chamber; and
    a cover layer mounted on a perimeter of the outer opening to form an outer chamber in which the inner chamber is disposed,
    wherein the filter screen separates the inner chamber from the outer chamber, and
    wherein the filter screen prevents froth from crossing and allows coalesced fluid to cross into the outer chamber.

2. The device of claim 1, wherein the cover layer is formed of a film that prevents fluid from passing therethrough.

3. The device of claim 1, wherein the inner chamber is defined by the filter screen on a first side and a wall of the frame on a second side, the second side being opposite the first side.

4. The device of claim 3, wherein a gap in the inner chamber between the filter screen and the wall of the frame is sized to accommodate bubbles in a froth in the inner chamber such that the bubbles are substantially in a single-wide formation in which the bubbles are stacked along a first axis and no bubble is adjacent to any other bubble along a second axis perpendicular to the first axis.

5. The device of claim 1, wherein the filter screen is a first filter screen, the device comprises a second filter screen, and the inner chamber is defined by the first filter screen on a first side of the inner chamber and by the second filter on a second side of the inner chamber, the second side being opposite the first side.

6. The device of claim 5, wherein a gap in the inner chamber between the first filter screen and the second filter screen is sized to accommodate bubbles in a froth in the inner chamber such that the bubbles are substantially in a single-wide formation in which the bubbles are stacked along a first axis and no bubble is adjacent to any other bubble along a second axis perpendicular to the first axis.

7. The device of claim 1, further comprising:
an inlet port extending through the frame and into the inner chamber;
an outlet port extending from the outer chamber and through the frame; and
an air vent at least in communication with the inner chamber.

8. The device of claim 7, wherein the inlet port is positioned near a bottom portion of the inner chamber, the outlet port is positioned near a bottom portion of the outer chamber, and the air vent is positioned near a top portion of the inner chamber.

9. The device of claim 7, wherein the air vent includes a labyrinth formed in the frame.

10. The device of claim 7, further comprising a membrane on an outer surface of the frame, the membrane sealing the air vent, the membrane being formed of a material to prevent fluid from passing therethrough.

11. The device of claim 1, wherein the outer chamber includes a sump portion for collection of coalesced fluid.

12. A device, comprising:
a substantially rectangular housing having an outer rim along an open face;
a recessed rim being recessed within the outer rim and within the housing, the recessed rim having a profile lying within the profile of the outer rim;
a filter screen mounted on the recessed rim to form an inner chamber, the filter screen to prevent froth from passing therethrough and to allow coalesced fluid from passing therethrough; and
a cover layer mounted on the outer rim to form an outer chamber in which the inner chamber is disposed, the filter screen separating the inner chamber from the outer chamber.

13. The device of claim 12, wherein the housing is substantially rectangular.

14. The device of claim 12, wherein the inner chamber is defined at least on one side by the filter screen, and the outer chamber is defined at least by the filter screen on a first side and the cover layer on a second side, the second side being opposite the first side.

15. A method, comprising:
receiving froth in a first chamber of a housing formed by an inner opening of the housing and a filter screen on a side of the first chamber, the first chamber having a width sized to accommodate bubbles in the froth such that the bubbles are substantially in a single-wide formation in which the bubbles are stacked along a first axis and no bubble is adjacent to any other bubble along a second axis perpendicular to the first axis;
receiving coalesced fluid through the filter screen in a second chamber from the first chamber, the second chamber formed by an outer opening of the housing and a cover layer on a side of the second chamber, the first chamber disposed within the second chamber; and
venting air from the first chamber through a vent that is in communication with the first chamber.

* * * * *